United States Patent [19]

Morikawa et al.

[11] Patent Number: 5,626,301
[45] Date of Patent: May 6, 1997

[54] STEEL MATERIAL SHEARING MACHINE

[75] Inventors: Sumio Morikawa, Sakai; Masahiro Kondoh, Osaka, both of Japan

[73] Assignee: Ohyodo Diesel Co., Ltd., Osaka-fu, Japan

[21] Appl. No.: 422,521

[22] Filed: Apr. 13, 1995

[30] Foreign Application Priority Data

Apr. 18, 1994 [JP] Japan ................... 6-078289

[51] Int. Cl.[6] .................................................. B02C 1/06
[52] U.S. Cl. ........................ 241/266; 241/101.73
[58] Field of Search ............. 30/134; 241/101.72, 241/101.73, 266

[56] References Cited

U.S. PATENT DOCUMENTS 5,044,569  9/1991  LaBounty et al. ............. 241/101.73 X

FOREIGN PATENT DOCUMENTS

0529380A3  3/1993  European Pat. Off. .
0629460A1  12/1994  European Pat. Off. .

*Primary Examiner*—Mark Rosenbaum
*Attorney, Agent, or Firm*—Armstrong, Westerman, Hattori, McLeland & Naughton

[57] ABSTRACT

A shearing machine for steel material adapted to be mounted, as an attachment, on a forward end of an arm of a working machine such as a power shovel is provided. The shearing machine comprises a body of the shearing machine having a longitudinal axis, a pair of upper and lower jaws pivotably supported at a forward end portion of the body of the shearing machine by means of a common shaft for open-close movement relative to one another, a pair of upper and lower shearing blades attached respectively to the upper and lower jaws. The upper and lower shearing blades defining a shearing plane in which shearing action for a steel material proceeds.

2 Claims, 4 Drawing Sheets

STEEL MATERIAL SHEARING MACHINE

FIELD OF THE INVENTION

This invention relates to a shearing machine for steel material that is mounted, as an attachment, on a forward end of an arm of a working machine, such as a power shovel, in order to shear steel material at a destruction site for scrap or waste items. More particularly, the invention relates to a shearing machine which provides an unobstructed view from an operator's seat of shearing blades of such shearing machine and which also provides an increased shearing ability of their shearing blades.

BACKGROUND OF THE INVENTION

A shearing machine for steel material is widely used which is mounted as an attachment on a forward end of an arm of a working machine, such as a power shovel, in order to shear or cut steel material at a destruction site for scrap or waste items. Various types of shearing machines are known. Generally, such shearing machines include a body, and a pair of upper and lower jaws supported at the forward end portion of the body for open-close movement relative to one another. Each of the upper and lower jaws includes a shearing blade attached thereto. Depending upon a particular application of the shearing machine, the upper and lower jaws are supported by a common shaft (single-pivot type), or by separate two shafts (double-pivot type). In general, a single-pivot type is suitable for a shearing machine having a relatively shorter open-close stroke of jaws, while, a double-pivot type is suitable for a shearing machine having a relatively longer open-close stroke of jaws.

The body of the shearing machine is, in general, formed at the rearward end portion thereof with two holes for pin connection. A first connection pin is inserted through one of the holes in the shearing machine body and a hole for pin connection in the forward end of the arm of the working machine. A second connection pin is inserted through the other hole in the shearing machine body and a hole for pin connection in the forward end of a piston rod of an arm cylinder of the working machine (depending upon a particular case, a link rod may be used). Thus, the shearing machine body may be pivoted in the vertical direction upon contraction or extension of the arm cylinder.

Depending upon the particular type of the shearing machine, one or two cylinders are disposed on the shearing machine body. The cylinder(s) cause vertical, open-close movement of the upper and lower jaws. When one cylinder is used, the forward end of the piston rod and the upper jaw are directly connected. Thus, the lower jaw functions as a stationary jaw. Then two cylinders are used, the forward end of each of the piston rods is directly connected to a respective one of the upper and lower jaws.

In a conventional shearing machine of a single-pivot, two-cylinder type, the cylinders are arranged in a vertical orientation. That is to say, the two cylinders are disposed at vertically opposite sides of the shearing machine body, so that they protrude vertically from the shearing machine body in an aligned manner along a line in a plane extending in the open-close direction of the upper and lower jaws, i.e., in the direction in which shearing action of the shearing machine proceeds.

In the shearing machine of a single-pivot type mentioned above, a relatively shorter distance is defined between the upper and lower jaws, so that the shearing machine, per se, is thin in the vertical direction. It is noted, however, that the two cylinders are so disposed as to protrude from the shearing machine body in the vertical direction. Such cylinders obstruct an operator to view the shearing blades from an operator's seat. Depending upon the position of the shearing machine, it is, therefore, difficult for the operator to view the shearing action of the shearing machine.

The shearing machine of a single-pivot type is advantageous in that it has a shorter open-close stroke of the jaws. To the contrary, such advantage might constitute some disadvantage. That is to say, when steel material is clamped between the shearing blades of the upper and lower jaw having a shorter open-close stroke, the shearing blades represent a widely opened configuration being divergent toward the forward ends of the shearing blades. Thus, it is possible for the steel material to be slipped toward the forward ends of the shearing blades as the upper and lower jaws are closed.

SUMMARY OF THE INVENTION

It is an object of the instant invention to provide a shearing machine of a single-pivot and two-cylinder type for steel material which provides an unobstructed view from an operator's seat of a working machine to shearing blades and which securely clamps and shears steel material.

In order to eliminate the disadvantage of a shearing machine of a single-pivot type in that steel material once clamped tends to be slipped, a shearing blade of the each of upper and lower jaws is angled outwardly. In addition, and in order to prevent lateral or transverse movement of the shearing blades away from one another due to the lateral or transverse movement of the upper and lower jaws from one another, the forward shearing blade (the shearing blade portion disposed forwardly of the mid-point of the shearing blade) and the rearward shearing blade (the shearing blade portion rearwardly of the mid-point of the shearing blade) of each of the upper and lower shearing blades are disposed at opposite sides of the shearing plane. In order to prevent a decrease in shearing pressure due to the surface-to-surface contact between the steel material and the shearing blades, because of the tendency of the steel material to be flattened at the mid-point of the shearing blades at the end of shearing action, the rearward shearing blade, disposed rearwardly of the mid-point of the shearing blades of each of the upper and lower shearing blades is angled, at at least one point thereof, outwardly in the open-close direction of the jaws, so as to form a vertical offset between the forward shearing blades and the rearward shearing blades. Preferably, the forward shearing blade and the rearward shearing blade of each of the upper and lower shearing blades are slightly spaced away from one another in the horizontal direction, so as to provide superior shearing action.

According to the invention, there is provided a shearing machine for steel material adapted to be mounted, as an attachment, on a forward end of an arm of a working machine, such as a power shovel comprising:

a body of the shearing machine having a longitudinal axis;

a pair of upper and lower jaws pivotably supported at a forward end portion of the body of the shearing machine by means of a common shaft for open-close movement relative to one another;

a pair of upper and lower shearing blades attached respectively to the upper and lower jaws;

the upper and lower shearing blades defining a shearing plane in which shearing action for a steel material proceeds;

a pair of hydraulic cylinders disposed respectively adjacent to upper and lower longitudinal edges of the body of the shearing machine and extending substantially in horizontal direction in parallel with the longitudinal axis of the body;

each of the hydraulic cylinders having a piston rod, the piston rod having a forward end pivotably connected to a respective one of the upper and lower jaws at its rearward end portion;

each of the upper and lower shearing blades having a forward shearing blade portion and a rearward shearing blade portion, the forward and rearward shearing blade portions defining a longitudinal mid-point therebetween;

the forward and rearward shearing blade portions of each of the upper and lower shearing blades defining an angle less than 180 degrees at the mid-point which faces inwardly in the open-close direction of the jaws;

the upper and lower shearing blades being configured so that, when the pair of jaws are engaged, the forward shearing blade portion of the upper shearing blade and the rearward shearing blade portion of the lower shearing blade are positioned on one side of the shearing plane, while the rearward shearing blade portion of the upper shearing blade and the forward shearing blade portion of the lower shearing blade are positioned on the other side of the shearing plane; and the rearward shearing blade portions of each of the upper and lower shearing blade being displaced outwardly in the open-close direction of the jaws so as to define at the mid-point an offset relative to the forward shearing blade portions.

OPERATION

Since the shearing blades are angled at their mid-point outwardly in the open-close direction of the jaws, steel material, which has become clamped between the shearing blades, does not tend to move forwardly in the longitudinal direction of the jaws. The interlocked engagement of the shearing blades (when the jaws are closed) prevents the shearing biases from moving laterally away from one another due to the repulsion force from the steel material. That is to say, when the upper and lower shearing blades are closed, the shearing ability of the shearing blades of conventional shearing machines in general, will be decreased by the fact that a gap is created between the shearing blades due to the repulsion force from the steel material. On the contrary, the shearing machine of the invention is so-constructed that the lateral or sideward force exerted between the forward shearing blades and that exerted between the rearward shearing blades are directed to opposite directions so as to be counterbalanced with each other. Thus, increased shearing ability may be obtained as if no lateral or sideward force is exerted between the shearing blades. It is common in conventional shearing machines that a steel material is flattened at the mid-point of the shearing blades at the end of the shearing action, so that the lower horizontal edge of the upper shearing blade at the mid-point thereof and the upper horizontal edge of the lower shearing blade at the mid-point thereof are contacted in surface-to-surface relationship. This disadvantageously increases the contact area between the steel material and the shearing blades, as compared with the initial stage and intermediate stage of the shearing motion of the shearing blades. Thus, an increased load is applied to the hydraulic cylinders for opening and closing the jaws of the shearing machine, whereby shearing ability of the shearing blades is extremely decreased. This frequently causes insufficient shearing of the steel material. On the contrary, and in accordance with the invention, there is provided the above-mentioned offset between the forward shearing blade and the rearward shearing blade of each of the upper and lower shearing blades. Thus, the shearing action starting from the forward ends of the upper and lower shearing blades to the mid-point precedes the shearing action starting from the rearward ends of the upper and lower shearing blades to the mid-point, even when the steel material is flattened at the end of the shearing action. This means that the shearing action by means of the forward shearing blades and the shearing action by means of the rearward shearing blades are terminated at different points of time. The above-mentioned offset between the forward cheering blade and the rearward shearing blade of each of the upper and lower shearing blades prevents the steel material from contacting with the shearing blades in their wide area including the mid-points thereof. Thus, shearing ability of the shearing machine during the final stage of the cutting action is substantially the same as that during the initial stage and the intermediate stage of shearing motion, whereby the steel material may be perfectly shorn. This means that it is possible for hydraulic cylinders of small power to easily shear steel material having an increased thickness and increased hardness.

These and other features and aspects of the invention, as well as its various benefits, will be made more clear in the subsequent detailed description of the preferred embodiments.

DETAILED DESCRIPTION OF THE PREFERRED EMBODIMENTS

Figure 1:
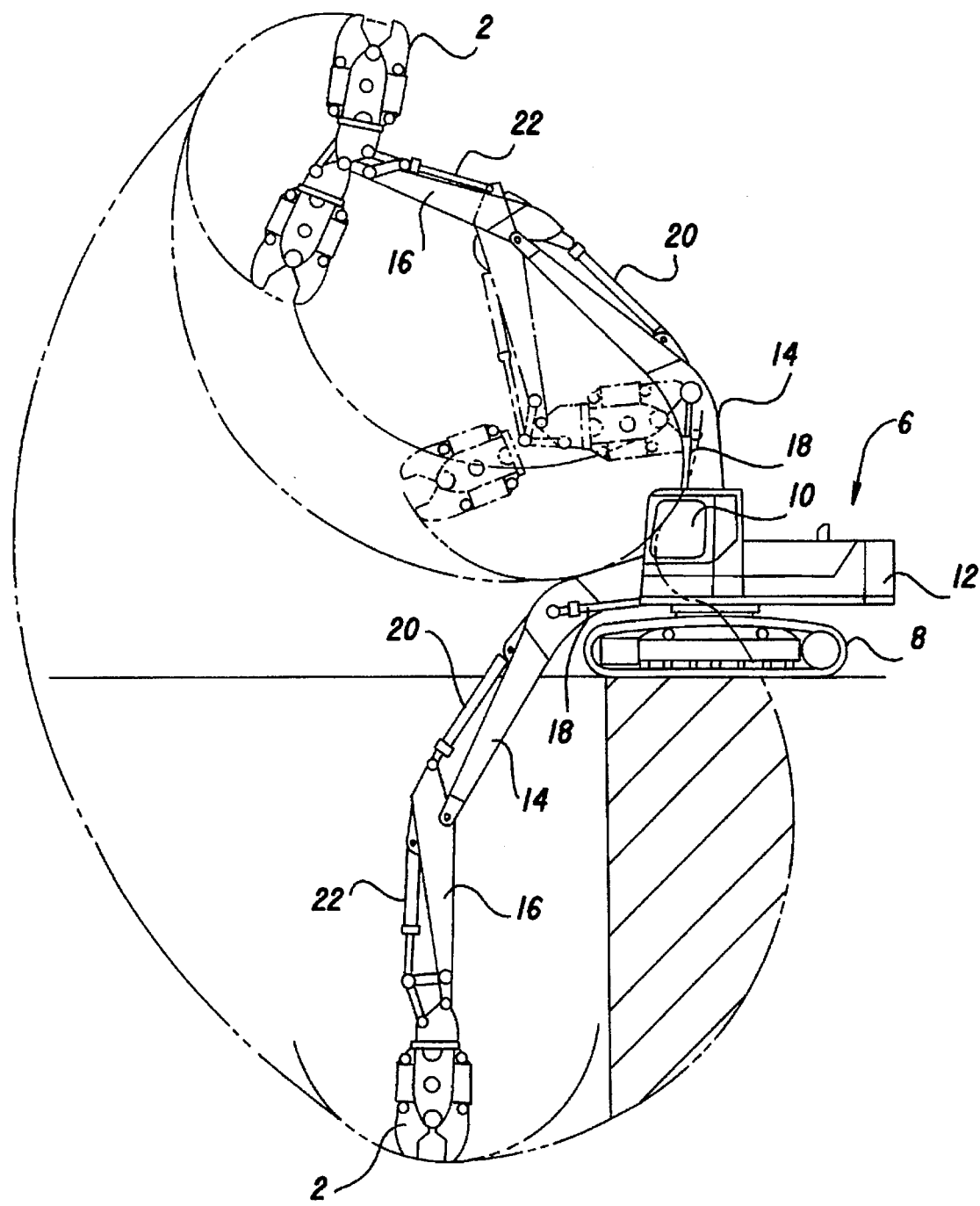
FIG. 1 is a side elevational view of a power shovel during working.
Figure 2:
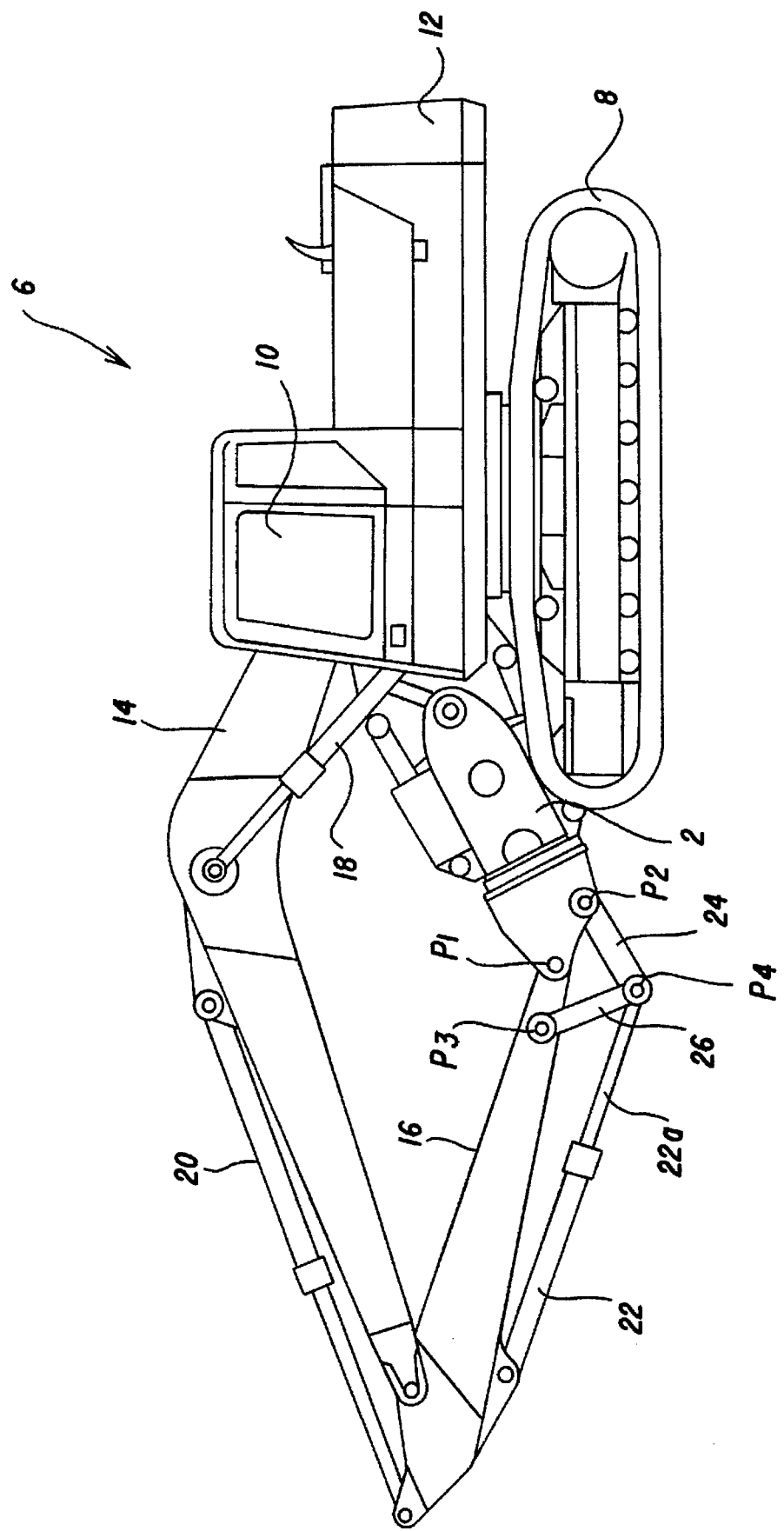
FIG. 2 is a side elevational view of a power shovel incorporating the present invention.

One embodiment of the invention will be explained in detail below with reference to the accompanying drawings. FIGS. 1 and 2 are side elevational views illustrating a power shovel (working machine) 6 mounted with a steel material shearing machine 2 at the forward end of an arm 16. The power shovel 6 includes a pair of left-hand and right-hand crawlers 8, a swingable base 12 having an operator's seat 10, a boom 14 mounted on the swingable base for pivotable movement in the vertical direction, and an arm 16 connected to the boom 14 at its forward end for pivotable movement in the vertical direction. The boom 14 is driven by means of a first hydraulic cylinder 18, and the arm 16 is driven by means of a second hydraulic cylinder 20. Various attachments are attached to the forward end of the arm 16. These attachments are pivotably driven in the vertical direction by means of a third hydraulic cylinder 22 disposed along the arm 16. In the illustrated embodiment, a shearing machine 2, instead of a conventional bucket, is mounted on the arm 16 as the attachment. The body of the shearing machine 2 is connected at its rearward portion to the forward end of the arm 16 by means of a pin P1. The forward end of a piston rod 22a of the third hydraulic cylinder 22 is connected through a link plate 24 to the body 22a of the shearing machine 2 by means of a pin P2 slightly spaced from the pin P1. A support plate 26 is connected at one end to the arm 16 by means of a pin P3 disposed at a position slightly rearward from the forward end of the arm 16. The other end of the support plate 26 is connected to the piston rod 22a and to the link plate 24 by means of a pin P4 in a coaxial manner.

Figure 3:
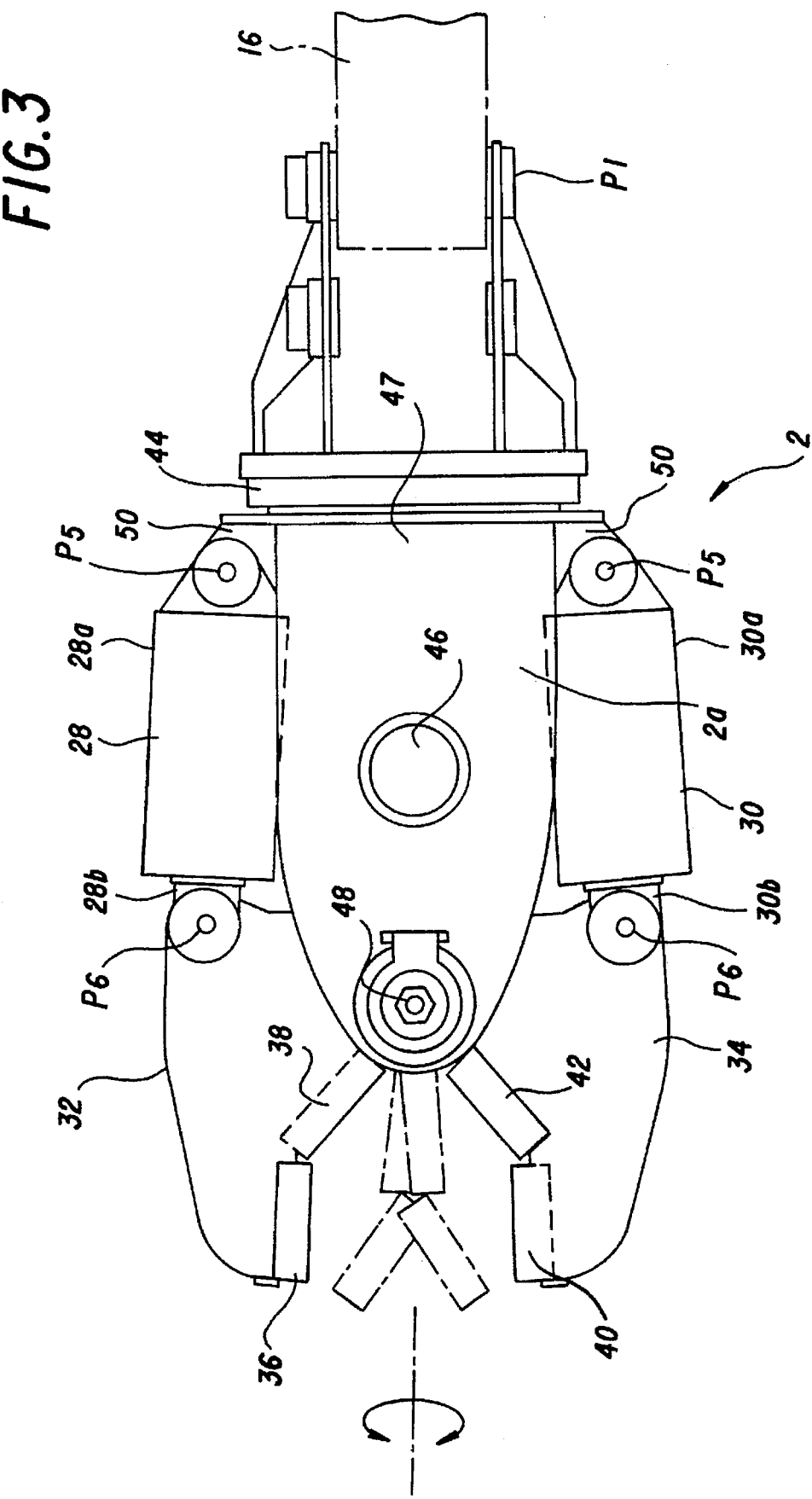
FIG. 3 is a side elevational view of a shearing machine according to the invention.

The shearing machine 2 includes, as shown in FIG. 3, a body 2a, a pair of upper and lower jaws 32, 34, a pair of upper and lower hydraulic cylinders 28, 30 for open-close operation of the jaws 32, 34, and shearing blades 36, 38 and 40, 42 secured respectively to the jaws 32, and 34. A rotation mechanism 44 is provided at the rearward portion of the shearing machine body 2a. The rotation mechanism is adapted to be rotated 360 degrees about the longitudinal axis thereof by means of a hydraulic motor. Thus, the shearing machine 2 may be rotated in the direction indicated by an arrow mark in FIG. 3.

The shearing machine body 2a includes a pair of front and back iron plates 47 which are spaced apart from one another so as to define a box-like configuration. An inspection window 46 is formed in the central portion of the iron plate. The inspection window permits one to inspect inside of the shearing machine body 2a. The upper jaw 32 and the lower jaw 34 are configured in a symmetrical manner and supported on the forward end portion of the shearing machine body 2a by a common support shaft 48 for open-close operation in a scissor like fashion (single pivot type). The upper jay 32 and the lower jaw 34 are, at their rearward portions, connected, by means of their respective hydraulic cylinders 28, 30, to a bracket 50 disposed at the rearward portion of the shearing machine body 2a. Specifically, bodies 28a, 30a of the hydraulic cylinders 28, 30 are connected to the bracket 50 by means of pins P5, and the forward ends of piston rods 28b, 30b are connected to the rearward portions of the upper jaw 32 and lower jaw 34, respectively, by means of pins P6.

Figure 4A:
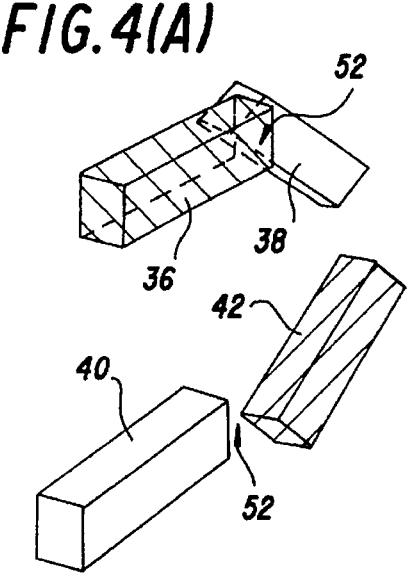
FIG. 4 (A) is a perspective view of shearing blades of the shearing machine of FIG. 3, and FIG. 4 (B) is a side elevational view of such shearing blades.
Figure 4B:
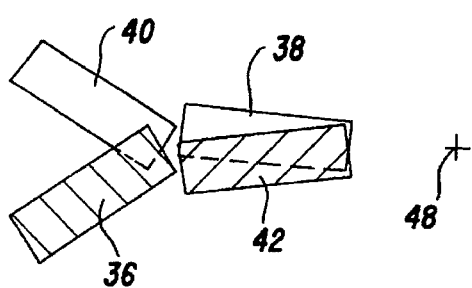

The opposite sides of the upper and lower jaws 32, 34 are adapted to represent, or form, an "interlocked relationship" or a "reversed arrangement". The upper shearing blades 36, 38, and the lower shearing blades 40, 42 are replaceably attached to the opposed angled sides of the jaws by means of bolts (not shown). The shearing blades 36, 38, 40 and 42 are so configured and arranged that, with regard to the upper shearing blades 36 and 38, the left-hand shearing blade 36 is positioned in front of the right-hand shearing blade 38, and that, with regard to the lower shearing blades 40 and 42, the right-hand shearing blade 42 is positioned in front of the left-hand shearing blade 40, when viewed in a direction perpendicular to the sheet of FIG. 3. Specifically, the forward shearing blade 36 (40) (the shearing blade portion disposed forwardly of the mid-point) and the rearward shearing blade 38 (42) (the shearing blade portion disposed rearwardly of the mid-point) of each of the upper and lower shearing blades are disposed on opposite sides of the shearing plane. This disposition is referred to as an "interlocked relationship" or a "reversed arrangement" of the shearing blades. This arrangement will be fully understood from FIGS. 4 (A) and (B) and FIGS. 5 (A) and (B). In these figures, the upper and lower shearing blades 36, 38 and 40, 42 are diagrammatically illustrated. In FIG. 4 (A), the jaws 32 and 34 are shown in their open position. In FIG. 4 (B), the jaws 32 and 34 are shown in their closed position. The shearing blades 36, 38, 40 and 42 are of an elongated, rectangular parallelepiped configuration. The shearing blades 36, 42 shaded are disposed in front of the blades 38, 40 without shading. This relationship is similarly applied to FIG. 5.

Figure 6:
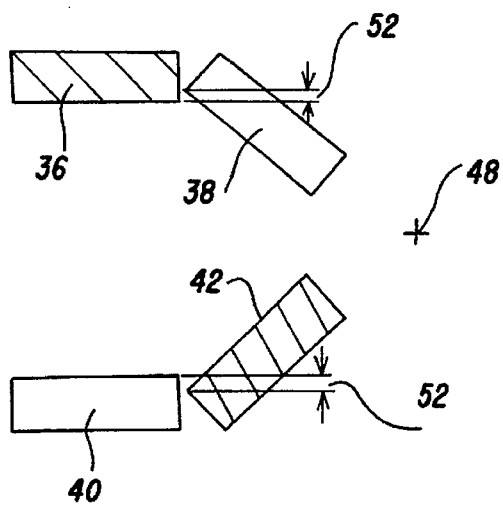
FIG. 6 is a side elevational view of the shearing blades of the invention.

As shown in FIG. 6, the upper shearing blades 36 and 38 (and the lower shearing blades 40 and 42) are so disposed that they form a doglegged configuration of which protrusion faces outwardly in the open-close direction of the jaws 32 and 34. Furthermore, the forward ends of the rearward shearing blades 38 and 42 are slightly offset outwardly relative to the rearward ends of the respective forward shearing blades 36 and 40 in the open-close direction of the jaws 32 and 34. Thus, a step or offset 52 is defined between the rearward end of the forward shearing blades 36 and 40 and the forward end of the rearward shearing blades 38 and 42, respectively. The offset 52 defined between the blades 36 and 38 is obtained by positioning the forward end of the blade 38 upwardly relative to the rearward end of the blade 36, and the offset 52 defined between the blades 40 and 42 is obtained by positioning the forward end of the blade 42 downwardly relative to the rearward end of the blade 40. A small gap is defined between the rearward end of the blade 36 (blade 40) and the forward end of the blade 38 (blade 42). Experimental results show that the above construction permits smooth shearing action.

The steel material shearing machine according to the invention is constructed as mentioned above. Upon shearing of steel material, the upper and lower jaws 32 and 34 are opened so that a steel material is placed between the upper shearing blades and lower shearing blades, as shown in FIG. 3 and FIG. 4(A). Then, the piston rods 28b and 30b respectively of the hydraulic cylinders 28 and 30 are extended so that the shearing blades 36, 38 and 40, 42 are closed, as shown in FIGS. 5 (A) and (B). If there is angular offset between the opening defined by the jaws 32 and 34 and the longitudinal axis of a steel material to be clamped, the shearing machine 2 is rotated to an appropriate angle for clamping the steel material by means of a rotation mechanism 44. These operations may be performed very easily, since the shearing blades 36, 38, 40 and 42 are directly viewable from the operator's seat 10. This viewability is due to the arrangement wherein the hydraulic cylinders 28 and 30 are disposed horizontally of the body 2a of the steel material shearing machine 2 adjacent to the upper and lower edges thereof respectively. This arrangement enables the operator to view the shearing blades 36, 38, 40 and 42 and their periphery from the operator's seat 10, without the hindrance of the hydraulic cylinders 28 and 30.

Figure 5A:
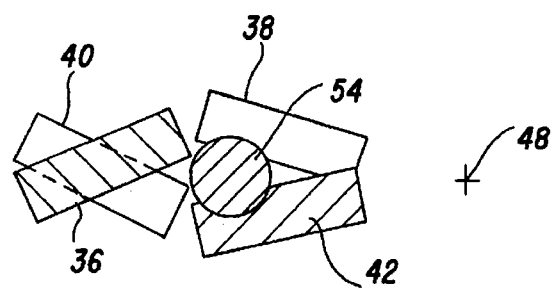
FIG. 5 (A) is a side elevational view of the shearing blades of the invention when a round steel bar 54 is shorn, and FIG. 5 (B) is a side elevational view of the shearing blades of the invention when a steel plate 56 is shorn.
Figure 5B:
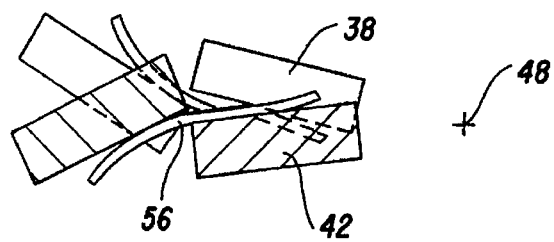

Shearing action of a steel material by means of the shearing machine will be explained in detail below. FIG. 5(A) illustrates a round steel bar 54 during shearing action thereof, and FIG. 5(B) illustrates a steel plate 56 during shearing action thereof. In a conventional shearing machine, when a round steel bar 54 is shorn, such a round steel bar will not be easily flattened extremely even at the end of the shearing action. It is noted, however, that such a round steel bar 54 tended to slide forwardly of the shearing blades 36, 38, 40 and 42. On the contrary, and in accordance with the sharing machine 2 of the invention, the shearing blades 36, 38, 40 and 42 are angled, and an offset is formed between the shearing blades 36 and 38, and between the shearing blades 40 and 42, Thus, a round steel bar 54 having a smooth surface, which is once clamped between the shearing blades, would not tend to slide forwardly. In the case of a steel plate 56, unlike the round steel bar 54, it is normally flattened at the end of the shearing action. With the conventional shearing machine, the shearing action starting from the forward end to the mid-point of the shearing blades, and the shearing action starting from the rearward end to the mid-point of the shearing blades are completed at the same time. Thus, the flattened steel plate 56 is contacted, in surface-to-surface relationship, with the upper and lower end surfaces of the shearing blades over a relatively wide range on the opposite sides of the mid-point of the shearing blades. This causes sudden power-loss of the hydraulic cylinders 28, 30. Specifically, during initial and intermediate stages of the shearing action in which the shearing action is proceeded at the forward end region and rearward end region of the shearing blades, the steel plate 56 and the shearing blades are contacted at a substantially point-like area, so that the force from the hydraulic cylinders 28 and 30 are effectively concentrated to the steel plate 56, whereby providing superior shearing ability. On the other hand, and at the end of shearing action, the steel plate 56 and the shearing blades 36, 38, 40 and 42 are contacted in a surface-to-surface relationship, so that the power from the hydraulic cylinders 28 and 30 are distributed over such wide area. Thus, only a portion of the shearing power contributes to the effective shearing action. In this regard, and in accordance with shearing machine 2 of the invention, the shearing action starting from the forward end to the mid-point of the shearing blades is first completed are shown in FIG. 5(B). FIG. 5(B) just shows the terminal point of such shearing action. Then, the shearing action starting from the rearward end to the mid-point of the shearing blades is completed (the shearing blades are closed further from the condition shown in FIG. 5(B). Thus, the surface-to-surface contact between the flattened steel plate 56 and the shearing blades over the area at the opposite sides of the mid-point, as mentioned above, will not occur. By this, the power from the hydraulic cylinders 28 and 30 may be effectively concentrated to the actual shearing portion.

When steel material having an increased thickness or an increased hardness is sheared by a conventional shearing machine, lateral force is applied to the shearing blades, thus causing the upper and lower shearing blades to be moved away from one another. This reduces shearing ability of the shearing blades. On the other hand, and in accordance with the shearing machine 2 of the invention, the sideward or lateral forces acting on the forward shearing blades and rearward shearing blades, respectively, are counterbalanced with each other. Thus, the shearing machine according to the invention provides a superior shearing ability, even in the case of shearing steel material having an increased thickness, without causing the above mentioned disadvantageous sideward or lateral movement of the shearing blades.

The invention has been explained above with regard to one embodiment. It is noted, however, that the invention is not limited to such an embodiment, but various alterations or modifications may be made. For example, the upper shearing blades (and the lower shearing blades) are angled and offset at one point. It is noted, however, that the upper shearing blades (and the lower shearing blades) may be angled and offset at more than one point.

In accordance with the invention, the shearing blade of a single-pivot and double-cylinder type is provided with two cylinders disposed at opposite sides of the shearing machine body and extending in the horizontal direction, as mentioned above. This arrangement permits an operator to directly view or observe the shearing blades from the operator's seat. Thus, the operator can easily and visually monitor the operation of the shearing blades to clamp steel material therebetween.

In accordance with the invention, the upper shearing blades (and the lower shearing blades) are angled into a doglegged configuration, so that steel material which has once clamped between the upper and lower shearing blades does not tend to escape from the shearing blades, regardless of the fact that the shearing machine is of a single-pivot type. The upper and lower shearing blades are so arranged that the forward shearing blades and the rearward shearing blade of each of the upper and lower shearing blades are disposed at opposite side of the shearing plane. This arrangement effectively prevents the upper and lower shearing blades from moving laterally away from one another. Furthermore, the rearward shearing blade of each of the upper and lower shearing blades is angled, at least one point thereof, outwardly in the open-close direction of the jaws, so as to form an offset between the forward shearing blades and the rearward shearing blades. This prevents the steel material (specifically, flattened steel material) from contacting with shearing blades in surface to surface relationship over a wide area on the opposite sides of the mid-point. Thus, the power from the hydraulic cylinders for opening and closing the jaws may be effectively concentrated to the steel material until the steel plate is shorn, thus providing an increased shearing ability of the shearing blades.

What is claimed is:

1. A shearing machine for steel material adapted to be mounted, as an attachment, on a forward end of an arm of a working machine comprising:

a body of the shearing machine having a longitudinal axis;

a pair of upper and lower jaws pivotably supported at a forward end portion of said body by means of a common shaft for open-close movement relative to one another;

a shearing blade attached to each of said upper and lower jaws;

said shearing blades attached to said jaws defining a shearing plane in which shearing action for a steel material proceeds;

a pair of hydraulic cylinders disposed respectively adjacent to upper and lower longitudinal edges of said shearing machine body and extending substantially in parallel with said longitudinal axis of said body;

each of said hydraulic cylinders having a piston rod and each said piston rod having a forward end pivotably connected to a respective one of said upper and lower jaws at the rearward end portion thereof;

each of said upper and lower shearing blades having a forward shearing blade portion and a rearward shearing blade portion, said forward and rearward shearing blade portions defining a longitudinal mid-point therebetween;

said forward and rearward shearing blade portions of each of said upper and lower shearing blades being mutually angularly displaced at an angle less than 180 degrees which faces inwardly in the open-close direction of said jaws at said mid-point;

said upper and lower shearing blades being configured so that, when the pair of jaws engage a workpiece to be sheared along a shearing plane, said forward shearing blade portion of said upper shearing blade and said rearward shearing blade portion of said lower shearing blade are positioned on one side of said shearing plane, while said rearward shearing blade portion of said upper shearing blade and said forward shearing blade portion of said lower shearing blade are positioned on the other side of said shearing plane;

said rearward shearing blade portions of each of said upper and lower shearing blades being displaced outwardly in the open-close direction of said jaws so as to define at said mid-point an offset relative to said forward shearing blade portions.

2. A shearing machine for a steel material according to claim 1, wherein a gap is defined between said forward shearing blade portion and said rearward shearing blade portion of each of said upper and lower shearing blades.

\* \* \* \* \*